United States Patent [19]

Kramer et al.

[11] Patent Number: 4,995,972
[45] Date of Patent: Feb. 26, 1991

[54] METHOD AND APPARATUS FOR REMOVING LIQUID FROM PERMEABLE MATERIAL

[76] Inventors: Timothy A. Kramer, 606 Bay Ave., Pt. Pleasant Beach, N.J. 08742; Kent M. Kramer, 7 Williams St., Rumson, N.J. 07760

[21] Appl. No.: 270,699

[22] Filed: Nov. 14, 1988

Related U.S. Application Data

[62] Division of Ser. No. 173,811, Mar. 3, 1988, Pat. No. 4,818,415.

[51] Int. Cl.⁵ .................. B01D 17/00; B01D 25/12; B01D 33/22
[52] U.S. Cl. .................. 210/179; 210/180; 210/184; 210/226; 210/351; 210/359; 210/386
[58] Field of Search .............. 210/171, 172, 175, 179, 210/180, 182, 184, 185, 186, 188, 224, 226, 230, 231, 241, 251, 258, 350, 351, 359, 386; 100/92, 177–181, 183, 184, 187

[56] References Cited

U.S. PATENT DOCUMENTS

| | | |
|---|---|---|
| 1,336,444 | 4/1920 | Salisbury . |
| 1,726,373 | 8/1929 | Voightlander . |
| 1,739,766 | 12/1929 | Morris . |
| 1,880,458 | 10/1932 | Morris . |
| 1,936,040 | 11/1933 | Shikata . |
| 2,320,474 | 6/1943 | Ross . |
| 2,476,282 | 7/1949 | Castellan . |
| 2,567,940 | 9/1951 | Karrer et al. . |
| 2,824,383 | 2/1958 | Machalek . |
| 3,000,106 | 9/1961 | Christgau . |
| 3,057,075 | 10/1962 | Lippke . |
| 3,354,035 | 11/1966 | Gottwald et al. . |
| 3,396,473 | 8/1968 | Turner . |
| 3,559,566 | 2/1971 | Aspegren et al. . |
| 3,699,663 | 10/1972 | Candor et al. . |
| 3,798,784 | 3/1974 | Kovats et al. . |
| 3,880,705 | 4/1975 | Tillburg . |
| 4,017,980 | 4/1977 | Kleinguenther . |
| 4,030,320 | 6/1977 | Riedel . |
| 4,116,831 | 9/1978 | Kent . |
| 4,193,869 | 3/1980 | Brucker et al. . |
| 4,296,555 | 10/1981 | Preston . |
| 4,461,095 | 7/1984 | Lehtinen . |
| 4,506,456 | 3/1985 | Lehtinen . |
| 4,655,932 | 4/1987 | Roslonski . |
| 4,740,311 | 4/1988 | Kryger . |

Primary Examiner—Frank Sever
Attorney, Agent, or Firm—Ralph W. Selitto, Jr.

[57] ABSTRACT

Disclosed herein are a method and apparatus for removing liquid from a permeable material, such as slurries, sludges, porous solids and permeable foams. The method and apparatus involve constraining the material to be deliquified such that the material interfaces with at least one surface which is permeable to the liquid to be removed and then heating the material at one or more locations remote from the permeable surface or surfaces. Such constraining and heating of the material causes the in situ vaporization of the liquid in the vicinity of the remote location or locations. The vaporized liquid expands and forces at least some of the remaining unvaporized liquid through the permeable surface or surfaces. Because only a portion of the liquid contained in the material must be vaporized and such vaporized portion is used to remove at least some of the remaining unvaporized liquid (thereby avoiding the necessity of vaporizing all of the liquid contained in the material), significant reductions in the energy required to substantially deliquify the material may be realized through the use of the method and apparatus disclosed herein.

40 Claims, 5 Drawing Sheets

METHOD AND APPARATUS FOR REMOVING LIQUID FROM PERMEABLE MATERIAL

This is a division of application Ser. No. 173,811, filed on Mar. 3, 1988, now U.S. Pat. No. 4,818,415 issued Apr. 4, 1989.

FIELD OF THE INVENTION

The present invention relates to methods and apparatus for removing liquid from a permeable material, and, more particularly, to such methods and apparatus which are especially adapted to deliquify sludges and slurries which contain particulate matter suspended in a liquid.

BACKGROUND OF THE INVENTION

Over the years, many different methods have been developed for removing liquids from solids. One common method involves a step by which the liquid is evaporated, leaving dry solids. In practice, such an evaporation step is usually preceded by at least one other dewatering step designed to remove as much liquid as possible before evaporation. The use of a pre-evaporation step or steps is preferred primarily for two reasons. First, the large amount of heat required to vaporize the liquid makes the evaporation step exceedingly expensive. Second, the time required to boil the liquid can make the evaporation step very time consuming. Thus, in order to reduce the cost and/or length of the evaporation step, a multi-step liquid removal process might be employed in which an evaporation step is preceded by any one or all of the following pre-evaporation steps: gravity settling; low-pressure filtration; and high-pressure filtration. Known techniques for accomplishing these individual steps are discussed in detail in "The Chemical Engineers Handbook".

When separating solids from water, as in the case of a primary water treatment system, gravity settling typically results in a slurry or sludge that is 1 to 10 percent solids by weight. The sludge can then be subjected to high-pressure filtration producing a filter cake that is approximately 30 to 40 percent solids by weight. The maximum percent solids that can be achieved by pressure filtration is limited by the point at which "solids hold-up" occurs (i.e., the point in the process at which the solid particles are compressed together to such an extent that they behave as a rigid block and will not compact further). However, when such a point in the process is reached, a significant amount of liquid still exists within the intersticies between the solid particles, the ratio of solids to liquid at this point being referred to as the "equilibrium solids concentration". In order to remove the remaining liquid, the filter cake is typically heated above the boiling temperature of the liquid and the liquid is evaporated off. The amount of energy required to remove the remaining liquid is still extremely large, even when such an evaporation step is preceded by a filtration step.

Most commercial filtration equipment, such as vacuum filters, leaf filters, centrifuges, belt filter presses and plate and frame filter presses, are incapable of producing filter cakes having an "equilibrium solids concentration", and, therefore, in practice, they usually produce what at best would be about a 40 percent solids filter cake. To completely dry a pound of such a filter cake, 0.6 pounds of liquid would have to be removed. If the liquid were water, at ideal efficiency almost 1000 BTU per pound would be required to evaporate the water, assuming such evaporation occurred at atmospheric pressure. Additional energy would also be required to raise the temperature of the solid/liquid mixture from ambient to vaporization temperature. Because the conventional drying processes are not 100 percent efficient, values of 1500–2000 BTU per pound of water removed are typical for such processes.

In view of the foregoing discussion, there is a real need for a process which is more effective than the known methods for removing liquids from solids. Because energy conservation is such an important concern nowadays, there is a further need for a deliquification process which, in addition to being more effective than the known methods, is also economic.

SUMMARY OF THE INVENTION

In accordance with the present invention, a method and apparatus for removing liquid from a permeable material involves constraining the material such that it interfaces with at least one surface which is permeable to the liquid contained in the material. The constrained material is then heated at one or more locations remote from the permeable surface or surfaces to a temperature sufficiently high to cause in situ vaporization of the liquid in the vicinity of the remote location or locations. As the vaporized liquid expands, it forces at least some of the remaining unvaporized liquid through the permeable surface or surfaces. The heating step is repeated until substantially all of the liquid has been removed from the material, whereby the material is substantially deliquified.

Several different types of heating techniques are suitable for use in conjunction with the present invention. They include: direct resistance heating produced by passing electric current through the material; dielectric heating produced by exposing the material to electromagnetic wave energy; and direct conduction heating. The type of heating technique to be employed is dependent upon the desired efficiency and upon the type of liquid being removed.

In one embodiment, the material to be deliquified is constrained in such a manner that it interfaces with a pair of surfaces located on opposite sides of the material, at least one of the surfaces being permeable to the liquid contained in the material. By adapting the surfaces for relative movement toward and away from each other, they can cooperate to compress the constrained material before and/or during its heating. Thus, prior to the performance of each and every heating step, at least some of the liquid can be expressed from the material through the permeable surface or surfaces. Such expression of the liquid can be facilitated by creating a vacuum on the side of the permeable surface or surfaces opposite from the constrained material.

BRIEF DESCRIPTION OF THE DRAWINGS

For a better understanding of the present invention, reference is made to the following detailed description of various exemplary embodiments thereof considered in conjunction with the accompanying drawings, in which.

DETAILED DESCRIPTION OF THE EXEMPLARY EMBODIMENTS

While the present invention is especially suited for removing liquid from slurries of solid particles, it can also be used to remove liquid from any permeable, porous solid, provided that the solid is properly constrained. Even deformable solids, such as foams, could be deliquified in accordance with the present invention. Because the present invention has such special utility for deliquifying slurries, the invention will be described below with particular reference to a slurry deliquification system.

Figure 1:
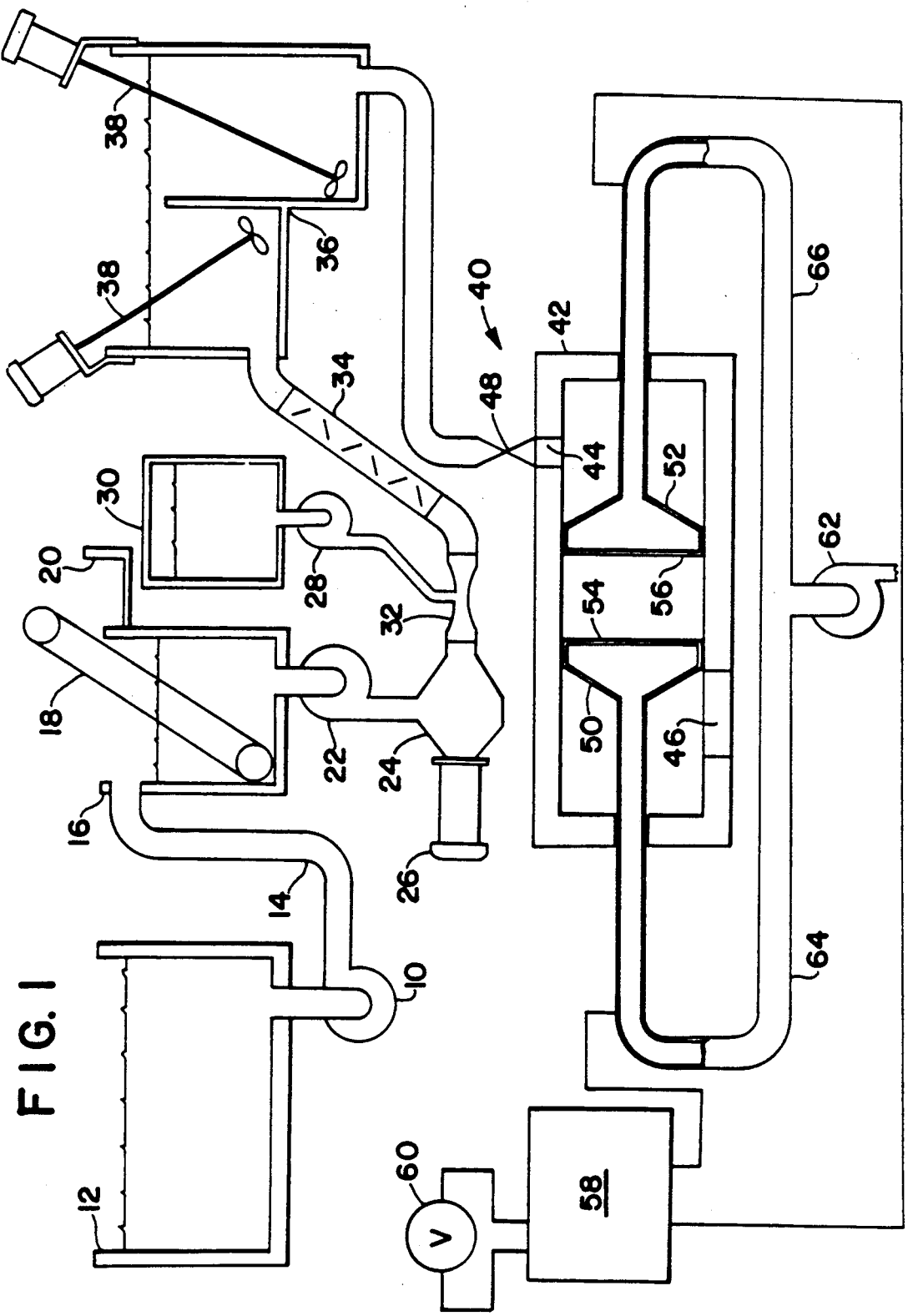
FIG. 1 is a schematic illustration of an overall system, including conditioning apparatus and deliquification apparatus, designed to condition a liquid slurry and then deliquify it in accordance with the present invention.

Referring initially to FIG. 1, a liquid slurry containing approximately 1 to 10 percent solids by weight is conveyed by a pump 10 from a source 12, such as a holding pond, settling tank, clarifier, etc., through a conduit 14 and into a tank 16 where a bar screen 18 or similar device removes large foreign objects (e.g., sticks, rocks, etc.) and deposits them in a receptacle 20. Another pump 22 conveys the slurry from the tank 16 to a macerator 24, which is driven by a motor 26. The macerator 24 grinds up any large particles that have passed through the bar screen 18 to thereby homogenize the slurry. A metering pump 28 delivers a chemical flocculate from a storage tank 30 to the slurry at a venturi port 32, which is downstream from the macerator 24. The metering pump 28 can be slaved to the pump 22 so that the flocculate will be continuously added to the slurry flowing from the macerator 24.

The flocculate is typically a chemical that causes the solid particles in the slurry to agglomerate and hence separate from the liquid. The addition of the flocculate greatly improves the speed and efficiency of filtration. However, the amount of the flocculate added to the slurry is critical. A general purpose anionic flocculate, such as that supplied by Stockhausen Chemical AG, can be mixed with water to achieve a 0.5 to 0.1 percent solution by weight of flocculate. There is an optimum mass ratio of slurry to flocculate solution that needs to be achieved. Typically, a 50 to 1 ratio of a 0.25 percent solution is added, but the amount is highly dependent upon the slurry composition. If too much flocculate is added, the slurry becomes gelatinous and is more difficult to deliquify than if no flocculate were added. If too little flocculate is added, filtration efficiency is relatively unaffected. The exact amount of flocculate to be added to a particular slurry is best determined by trial and error.

Next, the slurry and the flocculate must be adequately mixed to achieve the desired results. Mixing times of at least 30 seconds are normally required. Such mixing can be achieved by first passing the slurry/flocculate stream through a static mixer 34, which includes a sealed conduit having internal vanes adapted to induce turbulence in the flowing stream, and then into a dynamic mixing chamber 36, which includes mixers 38.

Having been properly conditioned, the slurry is now ready for filtration in deliquification apparatus 40 including cylinder 42, which is impermeable to the liquid contained in the slurry and which is made from an electrically non-conductive material. An inlet port 44 for the slurry is located at one end of the cylinder 42, while an outlet port 46 for the dry solids is located at an opposite end of the cylinder 42. A valve 48 controls the flow of the slurry from the mixing chamber 36 to the deliquification apparatus 40.

Pistons 50, 52 are mounted for reciprocating movement toward and away from each other within the cylinder 42, the pistons 50, 52 being moved by any suitable mechanism such as hydraulic actuators. The pistons 50, 52 are hollow with electrically conductive filter faces 54, 56, respectively, each of the filter faces 54, 56 having an air flow permeability in a range of from 5 to about 15 scfm per square inch at 15 psi pressure differential. The pistons 50, 52 are also electrically conductive so that an electrical flow path exists from the filter faces 54, 56 to the exterior of the cylinder 42. The electrical flow path also includes a power supply 58, such as a 110 volt 60 cycle power supply or a source of radio frequency current in a range of from about $8 \times 10^2$ to about $3 \times 10^5$ cycles per second, and a source 60 of line current at constant voltage. The pistons 50, 52 are connected to a two-way pump 62 by flexible conduits 64, 66, each of which is made out of an electrically non-conductive material. The two-way pump 62 allows the pressure to be lowered inside the pistons 50, 52 and permits cooling gases to be circulated to the filter faces 54, 56 for reasons which will be explained hereinafter.

Figure 2:
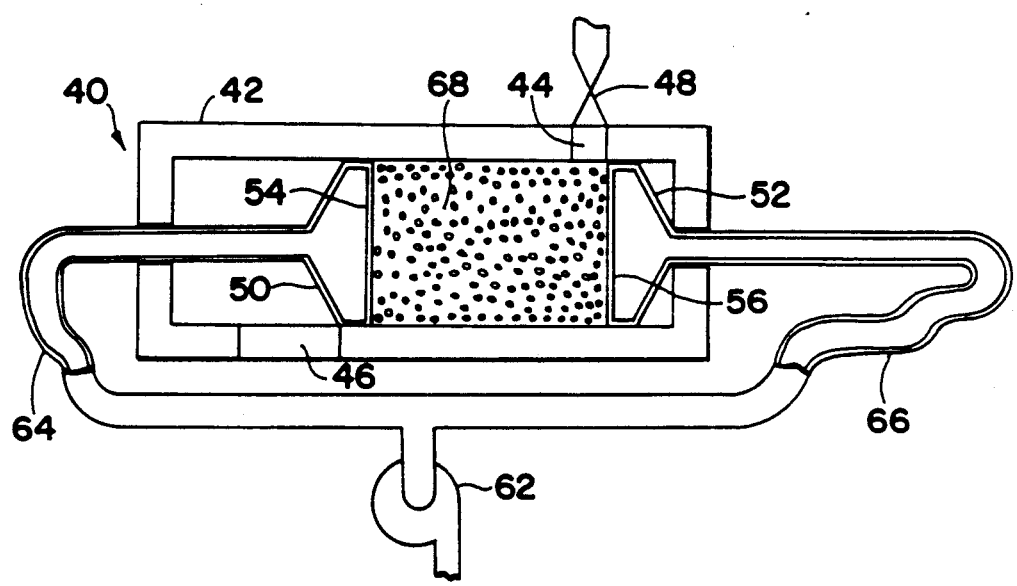
FIG. 2 is a schematic illustration of the deliquification apparatus used in the system of FIG. 1, such apparatus being shown in a slurry-filling phase of the deliquification process.
Figure 3:
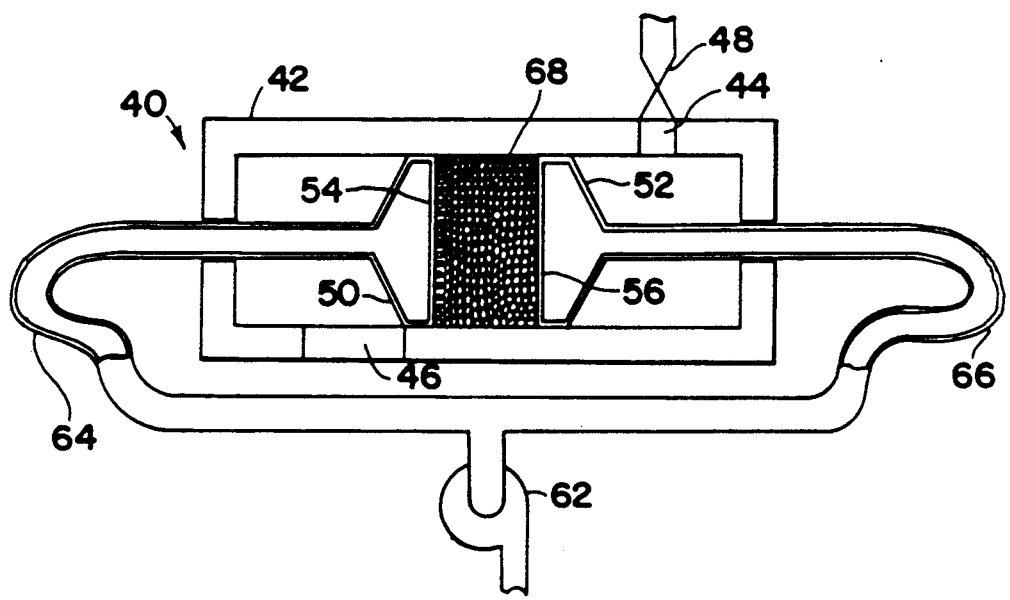
FIG. 3 is a schematic illustration of the deliquification apparatus of FIG. 2, the apparatus being shown in a liquid-expressing phase of the deliquification process.
Figure 4:
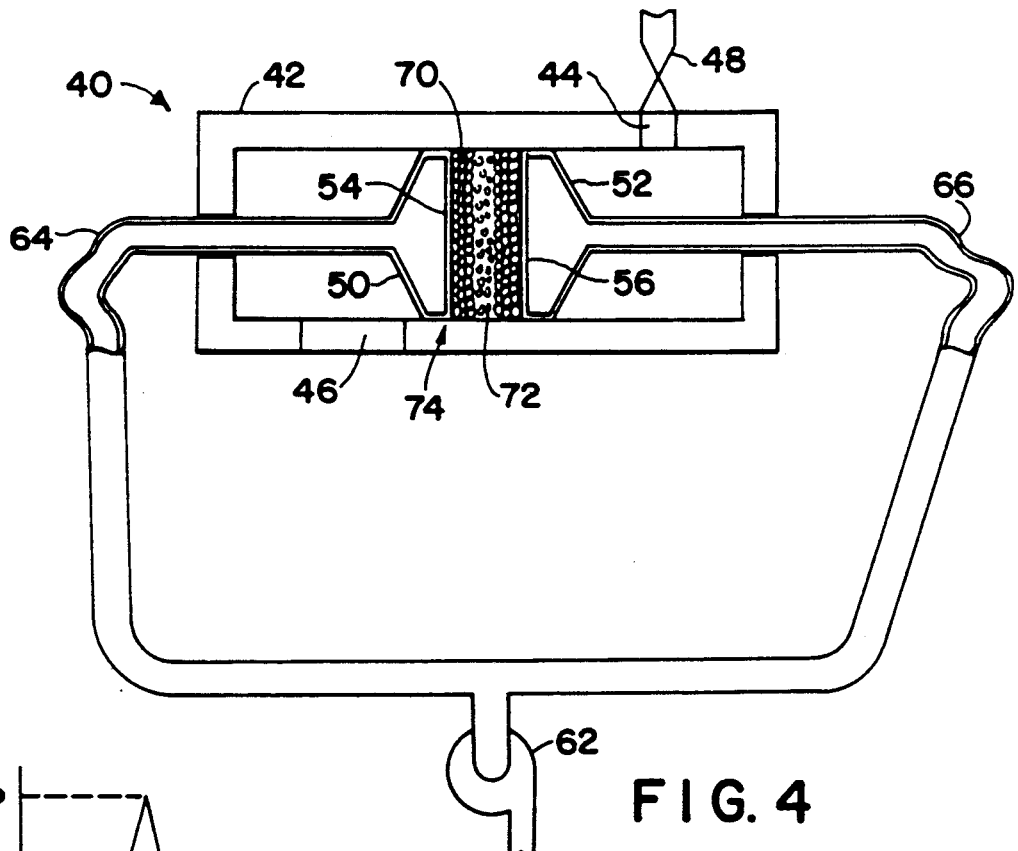
FIG. 4 is a schematic illustration of the deliquification apparatus of FIGS. 2 and 3, the apparatus being shown in an in situ vaporization phase of the deliquification process.

The operation of the deliquification apparatus 40 will now be described with reference to FIGS. 2-6. Referring to FIG. 2, after the piston 52 is moved away from the piston 50 to the position shown, the valve 48 is opened to allow the conditioned slurry to flow from the mixing chamber 36 to the cylinder 42 and then fill the void between the pistons 50, 52. By operating the pump 62 to lower the pressure within the pistons 50, 52, some of the liquid contained in the slurry entering the cylinder 42 is drawn through the filter faces 54, 56 and conveyed to the pump 62 through the conduits 64, 66. When the void between the pistons 50, 52 is filled with a slurry mass 68 (see FIG. 2), the valve 48 is closed and the pistons 50, 52 are moved toward each other (see FIG. 3) while the pump 62 continues to maintain a low pressure condition inside the pistons 50, 52, resulting in additional liquid being expressed through the filter faces 54, 56 and conveyed to the pump 62 through the conduits 64, 66.

Figure 5:
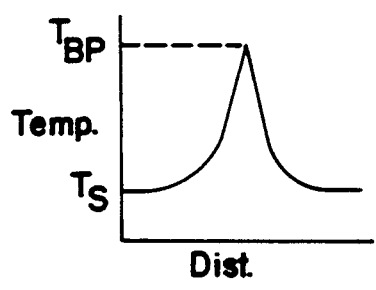
FIG. 5 is a graph showing an idealized profile of the temperature existing within the material being deliquified during the performance of the in situ vaporization phase of the deliquification process.

In a typical slurry of fine particulate matter, such as a primary drinking water sediment sludge, pressure filtration at 200 psi confining pressure results in a filter cake 70 (see FIG. 4) of 30% to 40% solids concentration by weight. To remove the remaining liquid from the filter cake 70, the pressure is maintained on the filter cake 70 by continuing to urge the pistons 50, 52 toward each other and by continuing to maintain a low-pressure condition inside the pistons 50, 52. The filter cake 70 is then heated so as to cause the in situ vaporization of the liquid located in a central region 72 of the filter cake 70. As the filter cake 70 is being heated, the filter faces 54, 56 are preferably maintained at a temperature lower than the vaporization temperature of the liquid, thereby ensuring that the greatest temperature rise and hence vaporization will occur only in the region 72. The graph shown in FIG. 5 depicts an idealized profile of the temperature that exists within the filter cake 70 along a path extending between the filter faces 54, 56.

As boiling occurs and as the vapor pressure increases in the region 72, the vapor expands and moves in the form of a front through the filter cake 70 towards the filter faces 54, 56, the vapor front sweeping non-vaporized liquid from the pores of the filter cake 70 and forcing the non-vaporized liquid out of the filter cake 70 through the filter faces 54, 56. Because the filter cake 70 is constrained between the cylinder 42 and the pistons 50, 52 during such in situ vaporization of the liquid, the cylinder 42 and the pistons 50, 52 must be capable of withstanding the vapor pressure of the liquid so that the volume of enclosure 74 defined thereby does not substantially increase as the vaporized liquid expands.

The particular method of heating is critical, because the filter cake 70 should be heated without heating the deliquification apparatus 40. Direct resistance heating is one acceptable heating method. In accordance with such a method, electric current at 110 volts and 60 Hz (cycles per second) is passed through the filter cake 70 by attaching the power supply 58 to the pistons 50, 52 such that as the voltage is applied across the filter faces 54, 56 of the pistons 50, 52, respectively, the current flows through the filter cake 70 causing resistance heating to occur. Since the filter faces 54, 56 are maintained at a temperature below the boiling (i.e., vaporization) temperature of the liquid, vaporization occurs at a location (i.e., in the region 72) which is equidistance from the filter faces 54, 56.

When direct resistance heating is employed, the current flow selected at the commencement of the heating step is important to the overall process efficiency. More particularly, the character of the temperature profile through the filter cake 70 resulting from a given current flow has been found to be determinative of displacement efficiency (i.e., the amount of non-vaporized liquid removed per liquid vaporized). In general, a current must be selected for a given filter cake 70 such that an optimum balance is achieved between the ideal temperature profile as shown in FIG. 5 and the heat loss through the filter faces 54, 56.

The current flow at any set voltage during the subsequent stages of the process will be automatically regulated by the resulting conductive properties of the pore network within the filter cake 70. That is, as the conductive liquid is removed from the pore network, conductivity and hence current flow are reduced. Thus, the voltage may be increased as conductivity decreases in order to reduce total processing time. The process may be terminated when a predetermined minimum current flow is achieved or when a uniform temperature profile occurs (i.e., when the temperature of those portions of the filter cake 70 which interface with the filter faces 54, 56 is equal to the vaporization temperature of the liquid).

The direct resistance heating method works well for permeable solid/liquid materials whose liquid component is a polar liquid, such as water or ammonia. To heat materials containing liquids that are non-polar, such as alcohols and other hydrocarbons, it is desirable that the power supply 58 be a radio frequency current source, instead of a 110 volt, 60 Hz source, whereby the filter faces 54, 56 would act as sending and receiving antennas. The exact frequency of the RE source, which typically would be in a range of from about $3 \times 10^5$ to about $8 \times 10^8$ cycles per second, must be tuned in to the optimum frequency of that which can be absorbed by the liquid.

Figure 6:
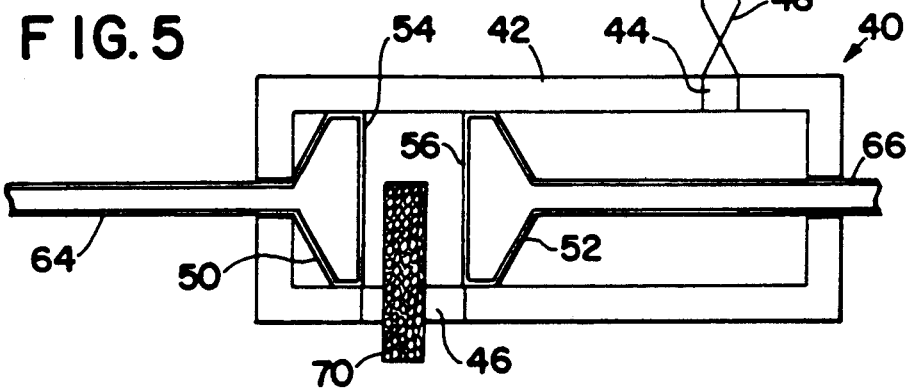
FIG. 6 is a schematic illustration of the deliquification apparatus of FIGS. 2–4, the apparatus being shown in a solids discharge phase of the deliquification process.

Once substantially all of the liquid has been removed from the filter cake 70, the pistons 50, 52 are moved to the positions indicated in FIG. 6 (i.e., positions which would align the filter cake 70 with the outlet port 46 in the cylinder 42 of the deliquification apparatus 40). The outlet port 46 can then be opened to permit the discharge of the substantially deliquified filter cake 70.

Figure 7:
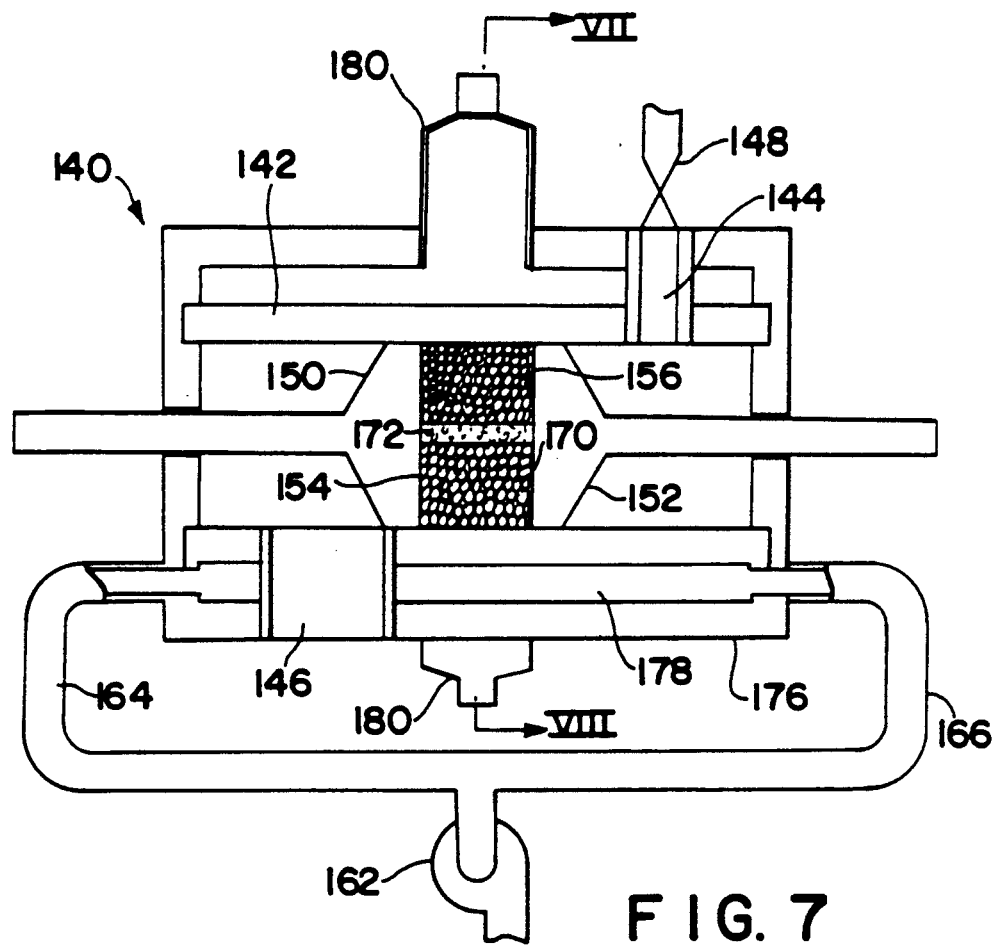
FIG. 7 is a schematic illustration of a modified embodiment of the deliquification apparatus illustrated in FIGS. 2–4 and 6, the modified embodiment of FIG. 7 being shown in an in situ vaporization phase of the deliquification process.
Figure 8:
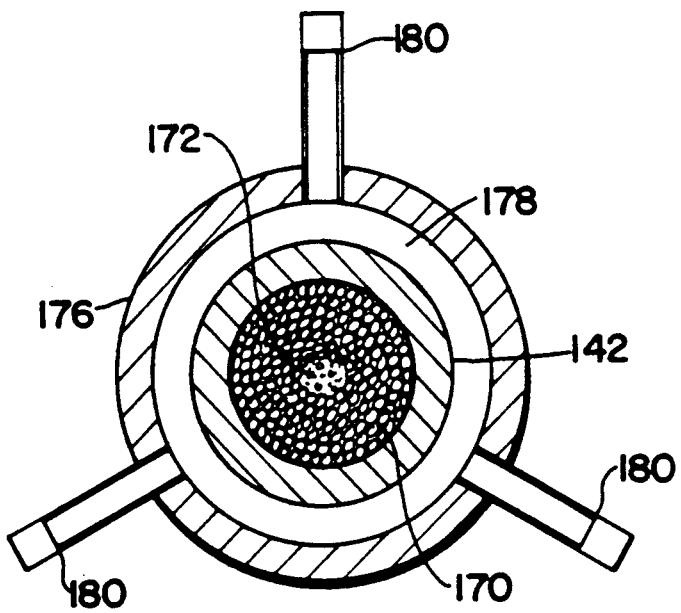
FIG. 8 is a cross-sectional view, taken along line VIII—VIII and looking in the direction of the arrows, of the deliquification apparatus illustrated in FIG. 7.
Figure 9:
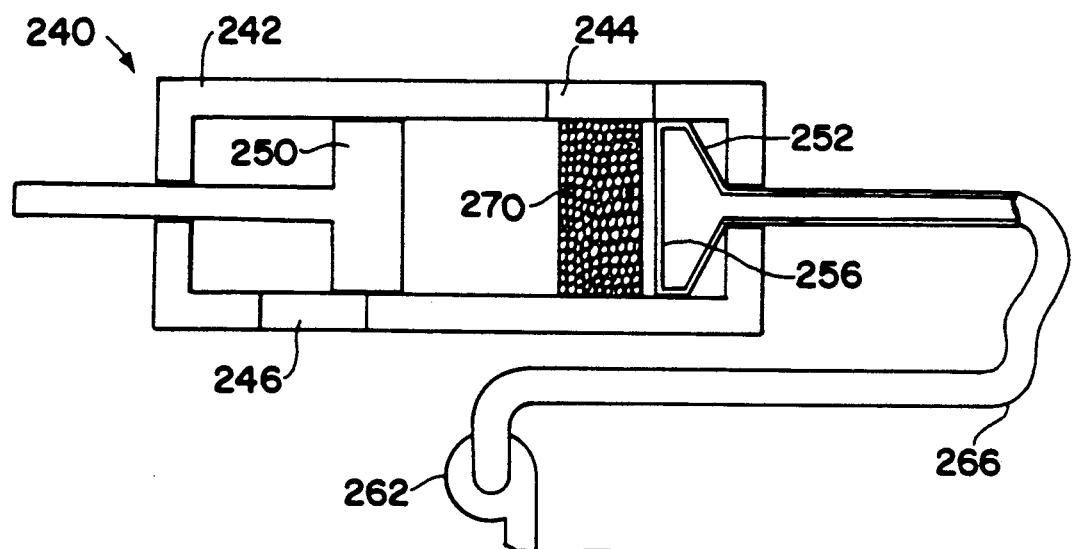
FIG. 9 is a schematic illustration of another modified embodiment of the deliquification apparatus illustrated in FIGS. 2–4 and 6, the modified embodiment of FIG. 9 being shown in a filter cake delivery phase of the deliquification process.
Figure 10:
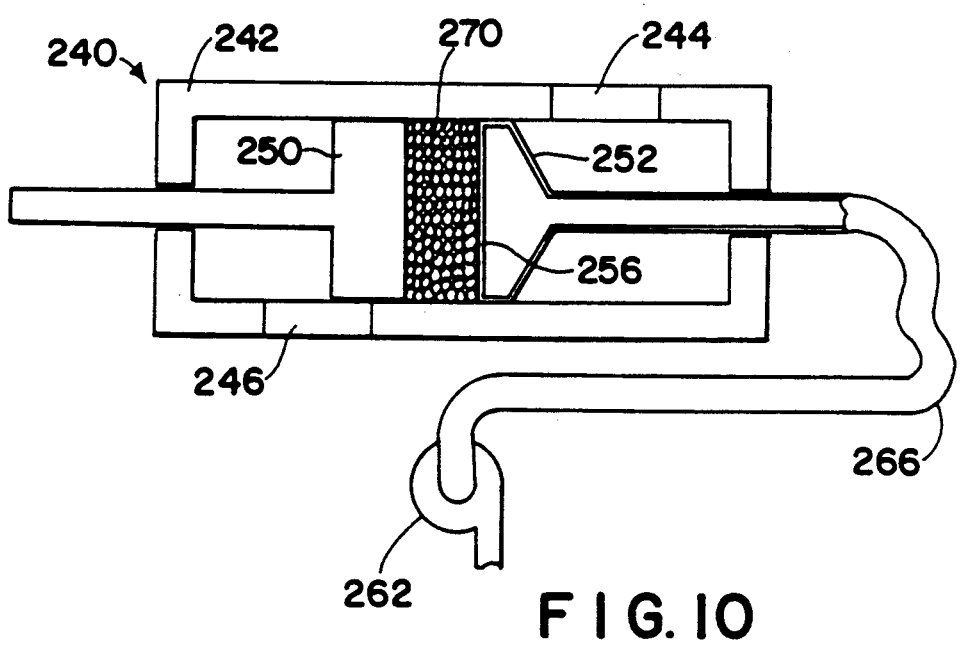
FIG. 10 is a schematic illustration of the deliquification apparatus of FIG. 9, the apparatus being shown in an in situ vaporization phase of the deliquification process.

Two alternate embodiments of the deliquification apparatus 40 are illustrated in FIGS. 7 and 8 and in FIGS. 9 and 10, respectively. The various elements illustrated in FIGS. 7 and 8 and in FIGS. 9 and 10 which correspond to elements described above with respect to the deliquification apparatus 40 are designated by corresponding reference numerals increased by one hundred and two hundred, respectively. Unless otherwise indicated, the alternate embodiments illustrated in FIGS. 7 and 8 and in FIGS. 9 and 10 operate in the same manner as the deliquification apparatus 40.

With reference to FIGS. 7 and 8, a deliquification apparatus 140 includes a cylinder 142, which is permeable to the liquid contained in a slurry being processed in the deliquification apparatus 140 and which is made from an electrically non-conductive material. Pistons 50, 152, which are made from an electrically non-conductive material, include filter faces 154, 156, which are impermeable to the liquid contained in the slurry and which are made from an electrically non-conductive material. The cylinder 142 is contained within a housing 176, which cooperates with the cylinder 142 to form an annular chamber 178. Conduits 164, 166 connect the chamber 178 to a pump 162. An inlet port 144, which extends through the chamber 178, is provided with a valve 148. An outlet port 146 extends through the chamber 178 and communicates with the cylinder 142. Microwave horns 180 are spaced at 120 degree intervals around the perimeter of the cylinder 178 (see FIG. 8). Although three of the horns 180 are shown in FIG. 8, only one would suffice. The horns 180 are positioned such that they are in direct alignment with a filter cake 170 constrained between the pistons 150, 152 and the cylinder 142.

In the operation of the deliquification apparatus 140, the liquid expressed by the pistons 150, 152 passes through the cylinder 142, rather than through the filter faces 154, 156. After the completion of such a pressure filtration step, the pressure is maintained on the filter cake 170 and microwave radiation emitted by the horns 180, which are connected to a suitable power supply (not shown), is absorbed by the filter cake 170, resulting in its heating in a central region 172. The temperature of the cylinder 142 is, at least initially, below the vaporization temperature of the liquid in order to ensure that vaporization occurs in the region 172. As the resulting vapor front sweeps through the filter cake 170, the non-vaporized liquid is swept from the pores of the filter cake 170 and forced out of the filter cake 170 through the cylinder 142.

The heating step can be controlled by monitoring the temperature of the filter cake 170 at its periphery (i.e., at that portion which interfaces with the cylinder 142). When the temperature being monitored reaches the boiling temperature of the liquid, the microwave energy is switched off and the cylinder 142 is cooled by using the pump 162 and the conduits 164, 166 to circulate cooling gas through the chamber 178. The heating step can then be repeated, with or without the maintenance of any mechanical or other force on the filter cake 170, to remove any residual liquid from the filter cake 170.

With reference to FIGS. 9 and 10, a deliquification apparatus 240 includes a cylinder 242, which is impermeable to the liquid contained in a filter cake 270 being processed in the deliquification apparatus 240. Pistons 250, 252 are mounted for reciprocating movement within the cylinder 242. The piston 250 is solid (i.e., impermeable to the liquid contained in the filter cake 270) and is adapted to be heated to a temperature which is greater than the vaporization temperature of the liquid contained in the filter cake 270. The piston 252 has a filter face 256 which is permeable to the liquid contained in the filter cake 270. A conduit 266 connects the piston 252 to a pump 262. An inlet port 244 and an outlet port 246, each of which is large enough to receive the filter cake 270, are provided in the cylinder 242.

In the operation of the deliquification apparatus 240, the filter face 256 is at a temperature below the boiling temperature of the liquid to be removed. The piston 250 is maintained at a temperature above the boiling temperature of the liquid and is either massive enough to avoid a significant temperature drop or is provided with heating means capable of supplying enough energy to vaporize a portion of the liquid without having the piston 250 experience a significant temperature drop. The best results have been obtained by having the piston 250 at an elevated temperature which is approximately 100° F. above the boiling temperature of the liquid. The filter cake 270 is then placed in the cylinder 242 through the inlet port 244 (see FIG. 9) and not allowed to contact the piston 250. The piston 252 is moved rapidly to bring the filter cake 270 into contact with the piston 250. Sufficient force is exerted by both of the pistons 250, 252 so as to constrain the filter cake 270 at a pressure greater than the vapor pressure of the liquid contained therein. A partial vacuum can also be maintained inside the piston 252 by the pump 262 to evacuate the liquid expelled from the filter cake 270. Vaporization of the liquid which interfaces with the piston 250 occurs almost instantaneously. As the resulting vapor front sweeps through the filter cake 270, the non-vaporized liquid is swept from the pores of the filter cake 270 and forced out of the filter cake 270 through the filter face 256.

The heating step can be controlled by monitoring the temperature of the filter cake 270 at that portion thereof which interfaces with the filter face 256. When the temperature being monitored reaches the boiling temperature of the liquid, the pistons 250, 252 can be moved away from the filter cake 270 and then cooled by using the pump 262 to draw air through the inlet port 244 and into the piston 252 through the filter face 256. Alternatively, only the piston 252, including the filter face 256, can be cooled, whereby the piston 250 is maintained at or near the elevated temperature referred to above so as to reduce the additional energy required to reheat the piston 250 in preparation for the performance of another heating step for the purpose of removing any residual liquid from the filter cake 270.

The deliquification apparatus 240 is primarily intended to deliquify the filter cake 270 or a permeable, porous solid which contains a liquid. However, it could also be utilized in connection with the deliquification of sludges and slurries.

It will be understood that the embodiments described herein are merely exemplary and that a person skilled in the art may make many variations and modifications without departing from the spirit and scope of the invention. All such variations and modifications are intended to be included within the scope of the invention as defined in the appended claims.

We claim:

1. Apparatus for removing liquid from a permeable material, comprising means for enabling vaporized liquid, as it expands, to force at least some of the remaining unvaporized liquid through at least one surface which is permeable to the liquid contained in the material, said means including constraining means for constraining the material such that the material interfaces with said at least one surface, and heating means for repeatedly heating the material at at least one location remote from said at least one surface to a temperature sufficiently high to cause the in situ vaporization of the liquid in the vicinity of said at least one location.

2. Apparatus according to claim 1, wherein said constraining means includes an enclosure which is capable of withstanding the vapor pressure of the liquid, whereby as the vaporized liquid expands the internal volume of said enclosure does not substantially increase as a result of such expansion, and wherein said enclosure includes said at least one surface.

3. Apparatus according to claim 2, wherein said enclosure includes a first surface located on one side of the material and a second surface located on an opposite side of the material, and wherein said at least one surface includes at least one of said first and second surfaces.

4. Apparatus according to claim 3, wherein said at least one surface includes said first surface and said first surface only, and wherein each location of said at least one location is adjacent to said second surface.

5. Apparatus according to claim 3, wherein said at least one surface includes both said first surface and said second surface, and wherein each location of said at least one location is substantially equidistance between said first and second surfaces.

6. Apparatus according to claim 3, wherein both said first surface and said second surface are electrically conductive.

7. Apparatus according to claim 6, wherein said heating means includes a source of electric current and means for passing the electric current through the material between said first and second surfaces.

8. Apparatus according to claim 7, wherein the flow of electric current is generated by connecting said first and second surfaces to a source of electric energy oscillating within a range of from about $6\times10^{12}$ to about $1\times10^2$ cycles per second.

9. Apparatus according to claim 9, further comprising terminating means for terminating the flow of electric current between said first and second surfaces when the material in the vicinity of said at least one surface reaches a temperature which is substantially equal to the vaporization temperature of the liquid.

10. Apparatus according to claim 9, further comprising cooling means for cooling said at least one surface to a temperature which is less than the vaporization temperature of the liquid, whereby said at least one surface can be cooled after the material has been heated.

11. Apparatus according to claim 10, wherein said cooling means cools said at least one surface before the material is reheated.

12. Apparatus according to claim 10, further comprising compressing means for compressing the material before the material is substantially deliquified, whereby at least some of the liquid can be expressed from the material before the material is heated.

13. Apparatus according to claim 12, wherein said compressing means compresses the material as the material is being heated.

14. Apparatus according to claim 12, wherein said compressing means includes said first and second surfaces and moving means for moving said first and second surfaces toward each other.

15. Apparatus according to claim 14, wherein said moving means moves said first and second surfaces away from each other to an extent such that the substantially deliquified material can be removed from said enclosure.

16. Apparatus according to claim 14, further comprising means for creating a low pressure region externally of said enclosure in the vicinity of said at least one surface, the pressure existing in said low pressure region being less than ambient pressure to thereby facilitate the expression of the liquid from the material.

17. Apparatus according to claim 2, wherein said enclosure is not electrically conductive.

18. Apparatus according to claim 17, wherein said heating means includes a source of electromagnetic radiation of a wavelength within a range of from about $7\times10^6$ to about $3\times10^8$ angstroms.

19. Apparatus according to claim 18, further comprising terminating means for terminating the electromagnetic radiation when said at least one surface reaches a temperature which is substantially equal to the vaporization temperature of the liquid.

20. Apparatus according to claim 19, further comprising cooling means for cooling said at least one surface to a temperature which is less than the vaporization temperature of the liquid, whereby said at least one surface can be cooled after the material has been heated.

21. Apparatus according to claim 20, wherein said cooling means cools said at least one surface before the material is reheated.

22. Apparatus according to claim 20, further comprising compressing means for compressing the material before the material is substantially deliquified, whereby at least some of the liquid can be expressed from the material before the material is heated.

23. Apparatus according to claim 22, wherein the compressing means compresses the material as the material is being heated.

24. Apparatus according to claim 22, wherein said enclosure includes a first surface located on one side of the material and a second surface located on an opposite side of the material, and wherein said compressing means includes said first and second surfaces and moving means for moving said first and second surfaces toward each other.

25. Apparatus according to claim 24, wherein said moving means moves said first and second surfaces away from each other to an extent such that the substantially deliquified material can be removed from said enclosure.

26. Apparatus according to claim 24, wherein said at least one surface includes neither said first surface nor said second surface, and wherein said apparatus further comprises means for creating a low pressure region externally of said housing in the vicinity of said at least one surface, the pressure existing in said low pressure region being less than ambient pressure to thereby facilitate the expression of the liquid from the material.

27. Apparatus according to claim 2, wherein said enclosure includes a first surface located on one side of the material and a second surface located on an opposite side of the material, and wherein said at least one surface includes said first surface but not said second surface.

28. Apparatus according to claim 27, wherein said heating means heats the material by direct conduction heating through said second surface.

29. Apparatus according to claim 28, further comprising terminating means for terminating the direct conduction heating of the material when the material in the vicinity of said at least one surface reaches a temperature which is substantially equal to the vaporization temperature of the liquid.

30. Apparatus according to claim 29, wherein said terminating means terminates the direct conduction heating of the material by moving said second surface relative to the material such that the material does not interface with said second surface.

31. Apparatus according to claim 29, wherein said terminating means terminates the direct conduction heating of the material by cooling said second surface.

32. Apparatus according to claim 29, further comprising cooling means for cooling said at least one surface to a temperature which is less than the vaporization temperature of the liquid, whereby said at least one surface can be cooled after the material has been heated.

33. Apparatus according to claim 32, further comprising compressing means for compressing the material before the material is substantially deliquified, whereby at least some of the liquid is expressed from the material before the material is heated.

34. Apparatus according to claim 33, wherein said compressing means compresses the material as the material is being heated.

35. Apparatus according to claim 33, wherein said compressing means includes said first and second surfaces and moving means for moving said first and second surfaces toward each other.

36. Apparatus according to claim 35, wherein said moving means moves said first and second surfaces away from each other to an extent such that the substantially deliquified material can be removed from said enclosure.

37. Apparatus according to claim 35, further comprising means for creating a low pressure region externally of said enclosure in the vicinity of said at least one surface, the pressure existing in said low pressure region being less than ambient pressure to thereby facilitate the expression of the liquid from the material.

38. Apparatus according to claim 1, further comprising compressing means for compressing the material before the material is substantially deliquified, whereby at least some of the liquid can be expressed from the material before the material is heated.

39. Apparatus according to claim 38, wherein said compressing means compresses the material before the material is heated and before it is reheated.

40. Apparatus according to claim 38, wherein said compressing means compresses the material as the material is being heated.

* * * * *